UNITED STATES PATENT OFFICE.

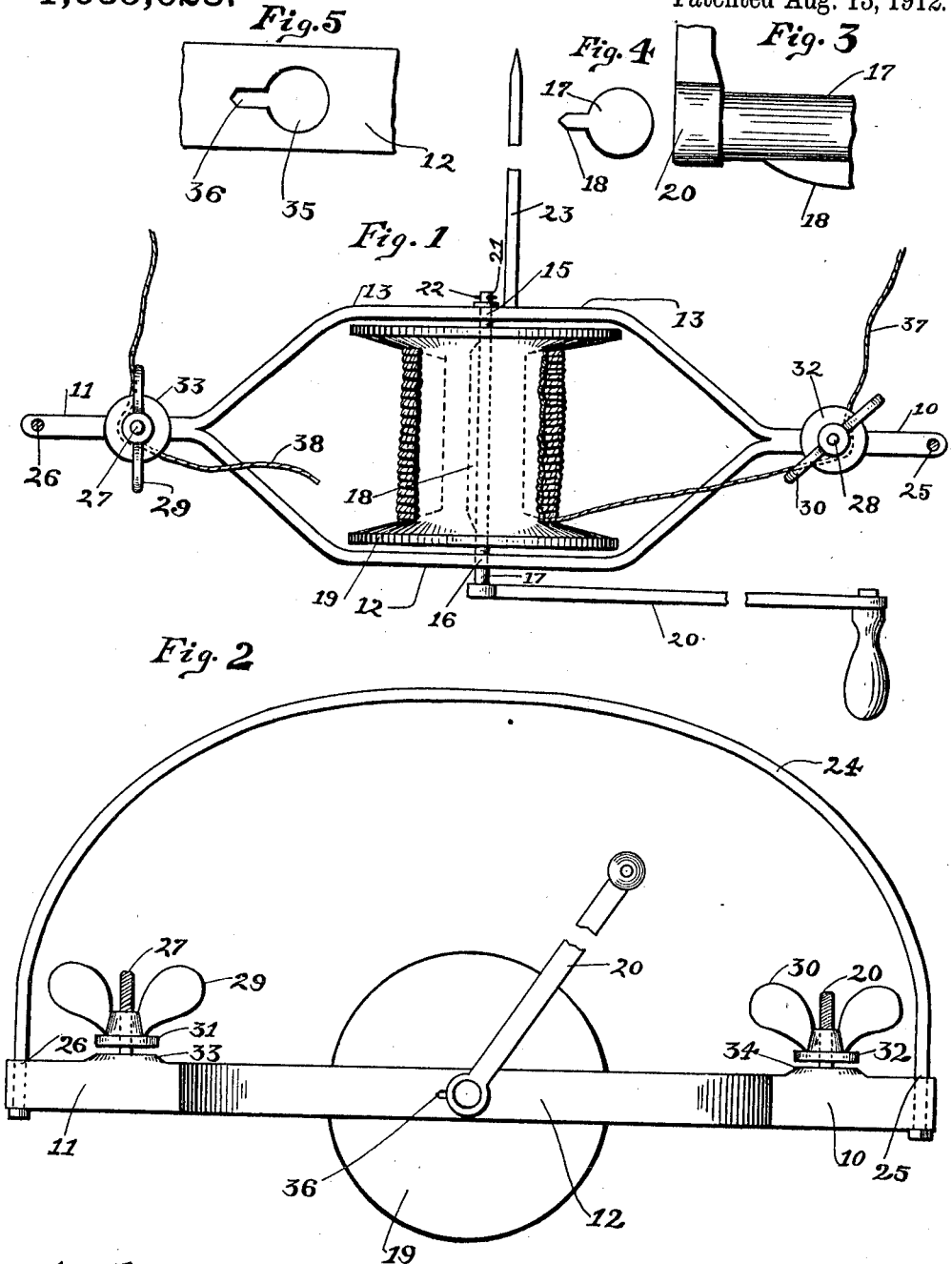

GEORGE F. MOYERS, OF NEW VIRGINIA, IOWA.

DEVICE FOR BINDING AND TYING CORN-SHOCKS.

1,035,628.  Specification of Letters Patent.  Patented Aug. 13, 1912.

Application filed February 21, 1911. Serial No. 610,113.

*To all whom it may concern:*

Be it known that I, GEORGE F. MOYERS, a citizen of the United States, residing at New Virginia, in the county of Warren and State of Iowa, have invented a new and useful Device for Binding and Tying Corn-Shocks, of which the following is a specification.

My invention relates to a device for binding and tying corn shocks and similar objects.

Devices for binding and tying corn shocks heretofore used and constructed consisted principally of a pulley and a rope or cable, the rope or cable being first placed around the corn shock, with which the shock was bound, then by placing another and separate cable or binding twine around the corn shock, with which the shock was tied. This arrangement made it necessary to make two separate operations and to carry a pulley and rope or cable for binding the shock and a separate wire or twine which was placed around the shock, after the same was bound, with which the shock was tied. According to my invention there is but one operation, that is, the binding and tying wire or twine are one and the same and the binding and tying of the shock is completed in one operation.

The object of my invention is to provide a device for binding and tying corn shocks in which a single piece of wire or twine is used for both binding and tying a shock.

A further object of my invention is to provide a device of this class of simple, durable and inexpensive construction designed to be easily and readily supported in position for binding and tying corn shocks.

A further object of my invention is to provide a device for binding and tying corn shocks so arranged that when the wire is placed in position around the shock, said wire can be easily and readily tightened and thereby firmly bind said shock.

The above and other features of novelty of my invention will become apparent from the detailed description of the accompanying drawings in which—

Figure 1 shows a plan view of a device made in accordance with my invention with certain of the parts broken away for clearness, Fig. 2 shows a side elevation of the same, Fig. 3 shows a detailed view of a portion of the crank shaft, Fig. 4 shows a detailed end view of the shaft, Fig. 5 shows a detail of a portion of one of the sides showing the opening therein.

Referring to the drawings in detail it will be seen that my device comprises a frame cast in one piece of metal having ends 10 and 11 and outwardly extending sides 12 and 13, said sides being provided with bearings in alinement at 15 and 16 to allow the shaft 17 to be rotatably mounted therein. 18 is a lug rigidly secured to said shaft which fits into a corresponding groove in the spool 19 to prevent the spool from revolving on the shaft when the device is being operated. A crank handle 20 is rigidly secured to the shaft 17 at its outer end by any suitable means. The inner end of the shaft is provided with an opening at 21 in which a key 22 is inserted to prevent the shaft from turning out of the bearings in the sides when the device is being operated.

23 is a supporting member preferably round and pointed at its outer end and is rigidly secured to the side 13 by any suitable means.

24 is a semi-cylindrical upwardly extending handle rigidly secured to the ends 10 and 11 of the frame at 25 and 26.

27 and 28 are screw threaded bolts rigidly secured to the ends 10 and 11 of the frame and provided with thumb screws 29 and 30 having bearing surfaces 31 and 32. The bearing surfaces 33 and 34 are cast with the ends 10 and 11 corresponding to and acting with the bearing surfaces 31 and 32 on the thumb screws 29 and 30 for engaging the wire or binding twine. The opening 35 in the side 12 is provided with a groove 36, as best shown in Fig. 5, to accommodate the lug 18 when the shaft 17 is being inserted or removed. The wire or binding twine 37 is wound on the spool 19.

It is obvious that the frame can be constructed of a single piece of material provided with outwardly and upwardly extending portions intermediate its ends, having said outwardly and upwardly extending portions provided with bearings in alinement for rotatably mounting a shaft therein. Therefore, I do not wish to limit myself to the specific form shown. It is also obvious that my device may be used without the spool, that is, by first winding the wire or binding material from the coil or spool on to the shaft 17.

In practical operation and assuming that the parts of the device are assembled in the manner set forth, the frame is first supported on the shock by forcing the supporting member 23 into the shock, the free end 38 of the wire or binding material 37 is then placed around the shock by bringing it first on the outside of the bolt 28 and under the bearing surface 32 of the thumb screw 30, as shown in dotted lines in Fig. 1, thence around the shock and on the outside of the bolt 27 and under the bearing surface 31 of the thumb screw 29, thence past the thumb screw a sufficient distance to leave a free end of sufficient length to form a tie. The thumb screw 29 is then screwed downwardly sufficiently to securely hold the wire or binding material. The handle 20 is then turned by the operator thus revolving the shaft 17 and the spool 19, by which the wire or binding material is drawn around the spool as the shaft is operated. This operation is continued until the shock is sufficiently compressed to suit the operator, at which time the thumb screw 30 is screwed downwardly sufficiently to securely hold the end of the wire attached to the spool. The operator then releases the handle and unwinds sufficient wire from the spool to tie with the free end 38. The wire or binding material is then cut from the spool and tied with the free end 38. The thumb screws 29 and 30 are then screwed upwardly sufficiently to release the wire or binding material. The wire or binding material is then lifted out from the thumb screws 29 and 30 and engages the shock. The device is then released from the shock by pulling the device as a whole outwardly sufficiently to disengage the supporting member 23. When desired to tie another shock it is again necessary to repeat this operation.

By means of the construction described and the operation of the same it will be seen that the semi-cylindrical upwardly extending handle 24 engages the shock when the device is being operated and prevents the device from turning on the shock.

While I have herein shown and described only one form of the embodiments of my invention it is to be understood that various changes and alterations may be resorted to by those skilled in the art without departing from the scope of the invention as defined in the appended claims.

Having thus described my invention what I claim as new and desire to secure by Letters Patent of the United States is:

1. In a device of the class described, a frame-work carrying at its side a sharpened spike which may be driven into a corn shock to secure the frame-work in position, means for supporting a reel of binding material on said frame-work in position to be rotated, a clamp at one end of said framework for holding an end of the binding material during the tying operation, a handle for turning said reel to wind in said binding material over the end of said frame-work, and clamping means in position to engage the tightened binding material to hold it taut while the material is being cut near the spool and while the ends are being secured together adjacent to said spool.

2. In a device of the class described, a frame-work carrying at its side a sharpened spike adapted to enter a corn shock to hold said frame-work in position, means for supporting a reel of binding material on said frame-work and for rotating said spool to pay out said binding material over one end of said frame-work or to reel it in thereover, clamping means in position to grip said binding material after the operation of reeling in is complete, and clamping means at the opposite end of said frame-work in position to hold the free end of said binding material during the tightening operation so that said binding material when held by said clamps may be cut near said spool so that a connection may be made between said clamps for holding said binding material permanently in position on the shock of corn.

3. In a device of the class described, the combination of the frame-work carrying a spike adapted for insertion in a shock of corn, an arched handle above said framework in position to be gripped by the operator while the tying operation is being carried out, means for supporting a reel of tying material on said frame-work and for rotating it thereon, clamping means on said frame-work at either side of said spool, one of said clamping means being adapted to hold the free end of said binding material and the other being in such position that said binding material may be reeled up by rotating the spool and then held by tightening said last named clamp, thereby leaving said binding material in position for tying between said clamps.

4. In a device of the class described, the combination of a frame-work carrying a spike adapted for insertion in a corn shock, said frame-work then lying across a side of the shock, means for supporting a spool of tying material to rotate with respect to said frame-work, said means including a shaft extending transversely to said frame-work and carrying a lug rigidly secured thereto and adapted to insure rotation of said spool when said shaft is turned, an arched handle connecting the opposite ends of said framework and arranged in position for use in steadying the frame during the tying operation, a bolt having a wing nut mounted at one end of said frame-work and positioned to serve as a clamp for the free end of the tying material, and a similar bolt and nut at the opposite end of said frame-work and in such position that the binding material may be reeled in and there clamped, so that the binding material may be tied between said clamps to form a permanent connection.

In witness whereof, I hereunto subscribe my name this 7th day of February, A. D. 1911.

GEORGE F. MOYERS.

Witnesses:
H. A. KERR,
G. M. VAN PATTEN.

Copies of this patent may be obtained for five cents each, by addressing the "Commissioner of Patents, Washington, D. C."